United States Patent
Ozono et al.

(10) Patent No.: US 10,124,788 B2
(45) Date of Patent: Nov. 13, 2018

(54) CONTINUOUSLY VARIABLE TRANSMISSION AND CONTROL METHOD THEREOF

(71) Applicant: JATCO Ltd, Fuji-shi, Shizuoka (JP)

(72) Inventors: Haruka Ozono, Isehara (JP); Yoshinobu Kawamoto, Seoul (KR)

(73) Assignee: JATCO LTD, Fuji-Shi (JP)

( * ) Notice: Subject to any disclaimer, the term of this patent is extended or adjusted under 35 U.S.C. 154(b) by 113 days.

(21) Appl. No.: 15/327,688

(22) PCT Filed: Feb. 16, 2015

(86) PCT No.: PCT/JP2015/054153
§ 371 (c)(1),
(2) Date: Jan. 20, 2017

(87) PCT Pub. No.: WO2016/013237
PCT Pub. Date: Jan. 28, 2016

(65) Prior Publication Data
US 2017/0203751 A1    Jul. 20, 2017

(30) Foreign Application Priority Data

Jul. 25, 2014 (JP) ................................ 2014-152167

(51) Int. Cl.
*B60W 20/10* (2016.01)
*F16H 61/12* (2010.01)
(Continued)

(52) U.S. Cl.
CPC .............. *B60W 20/10* (2013.01); *B60L 11/14* (2013.01); *B60L 15/20* (2013.01); *B60W 10/06* (2013.01);
(Continued)

(58) Field of Classification Search
CPC ............ F16H 61/12; F16H 2061/1284; F16H 61/66272; F16H 2059/147; B60W 20/10; B60W 10/107; B60W 2710/1083
See application file for complete search history.

(56) References Cited

U.S. PATENT DOCUMENTS

| | | | |
|---|---|---|---|
| 8,798,889 B2* | 8/2014 | Fujii ...................... | F16H 59/16 |
| | | | 280/734 |
| 9,545,912 B2* | 1/2017 | Takano ................... | B60K 6/48 |
| 2017/0066437 A1* | 3/2017 | Yamamoto ............... | B60K 6/48 |

FOREIGN PATENT DOCUMENTS

JP    2014-004928 A    1/2014

* cited by examiner

*Primary Examiner* — Sherry L Estremsky
(74) *Attorney, Agent, or Firm* — Foley & Lardner LLP

(57) ABSTRACT

A transmission controller determines hydraulic pressures supplied to a primary pulley and a secondary pulley on the basis of a torque calculation value in a case where an integrated controller does not detect a torque detection error, determines the hydraulic pressures supplied to the primary pulley and the secondary pulley on the basis of the torque calculation value in a case where the integrated controller detects the torque detection error and the torque calculation value is equal to or more than a predetermined value, and determines the hydraulic pressures supplied to the primary pulley and the secondary pulley on the basis of a torque value higher than the torque calculation value in a case where the integrated controller detects the torque detection error and the torque calculation value is less than the predetermined value.

5 Claims, 3 Drawing Sheets

(51) Int. Cl.

| | |
|---|---|
| *B60W 10/08* | (2006.01) |
| *B60W 10/107* | (2012.01) |
| *B60L 11/14* | (2006.01) |
| *B60L 15/20* | (2006.01) |
| *B60W 10/10* | (2012.01) |
| *B60W 20/00* | (2016.01) |
| *F16H 61/02* | (2006.01) |
| *F16H 61/662* | (2006.01) |
| *B60W 10/06* | (2006.01) |
| *B60W 20/30* | (2016.01) |
| *F16H 9/16* | (2006.01) |
| *F16H 59/14* | (2006.01) |
| *F16H 63/50* | (2006.01) |

(52) U.S. Cl.
CPC ............ *B60W 10/08* (2013.01); *B60W 10/10* (2013.01); *B60W 10/107* (2013.01); *B60W 20/00* (2013.01); *B60W 20/30* (2013.01); *F16H 9/16* (2013.01); *F16H 61/02* (2013.01); *F16H 61/12* (2013.01); *F16H 61/662* (2013.01); *F16H 61/66272* (2013.01); *B60W 2510/0657* (2013.01); *B60W 2510/083* (2013.01); *B60W 2710/0666* (2013.01); *B60W 2710/083* (2013.01); *B60W 2710/1005* (2013.01); *B60W 2710/1083* (2013.01); *F16H 59/14* (2013.01); *F16H 63/50* (2013.01); *F16H 2059/147* (2013.01); *F16H 2061/1284* (2013.01); *Y02T 10/7258* (2013.01)

CONTINUOUSLY VARIABLE TRANSMISSION AND CONTROL METHOD THEREOF

TECHNICAL FIELD

The present invention relates to a continuously variable transmission and a control method thereof.

BACKGROUND ART

JP2014-4928A discloses a vehicle that includes a motor-generator configured to be operated as an electric motor and an electric generator. The motor-generator is coupled to an output shaft of an engine via a belt.

SUMMARY OF INVENTION

The vehicle disclosed in JP2014-4928A includes a continuously variable transmission. The continuously variable transmission supplies a primary pulley and a secondary pulley with a hydraulic pressure to hold the belt, and controls the supplying hydraulic pressure to change a groove width of each pulley, so as to execute a shift.

The hydraulic pressure supplied to each pulley is decided based on a torque calculation value where a torque output from the output shaft of the engine is obtained by a calculation. Accordingly, when a torque generated by the motor-generator fails to be normally detected, a torque value actually output from the output shaft of the engine increases to higher than the torque calculation value, thus causing a force for each pulley to hold the belt to be lacked, so as to possibly make the belt slip.

It is an object of the present invention to prevent the belt of the continuously variable transmission from slipping in a case of a torque detection error of the motor-generator.

According to one aspect of the present invention, a continuously variable transmission included in a vehicle, the vehicle including a motor-generator and a power control unit, the motor-generator being coupled to an output shaft of an engine, the power control unit including a torque calculation means and an error detection means and being configured to control operations of the engine and the motor-generator, the torque calculation means being configured to calculate a torque output from the output shaft, the error detection means being configured to detect a torque detection error of the motor-generator, the continuously variable transmission being configured to shift a rotation of the output shaft to output to a wheel, is provided. The continuously variable transmission includes a primary pulley that has a groove width varied by a hydraulic pressure, the rotation of the output shaft being transmitted to the primary pulley, a secondary pulley that has a groove width varied by a hydraulic pressure, a rotation of the primary pulley being shifted to be transmitted to the secondary pulley via an endless member, and a shift control unit configured to control an operation of the continuously variable transmission, wherein the shift control unit includes a hydraulic pressure control means, the hydraulic pressure control means is configured to determine hydraulic pressures supplied to the primary pulley and the secondary pulley on a basis of a torque calculation value calculated by the torque calculation means of the power control unit in a case where the error detection means of the power control unit does not detect the torque detection error, the hydraulic pressure control means is configured to determine the hydraulic pressures supplied to the primary pulley and the secondary pulley on a basis of the torque calculation value in a case where the error detection means detects the torque detection error and the torque calculation value calculated by the torque calculation means is equal to or more than a predetermined value, and the hydraulic pressure control means is configured to determine the hydraulic pressures supplied to the primary pulley and the secondary pulley on a basis of a torque value higher than the torque calculation value in a case where the error detection means detects the torque detection error and the torque calculation value calculated by the torque calculation means is less than the predetermined value.

According to another aspect of the present invention, a control method for the above continuously variable transmission is provided.

DESCRIPTION OF EMBODIMENTS

The following describes embodiments of the present invention by referring to the attached drawings.

Figure 1:
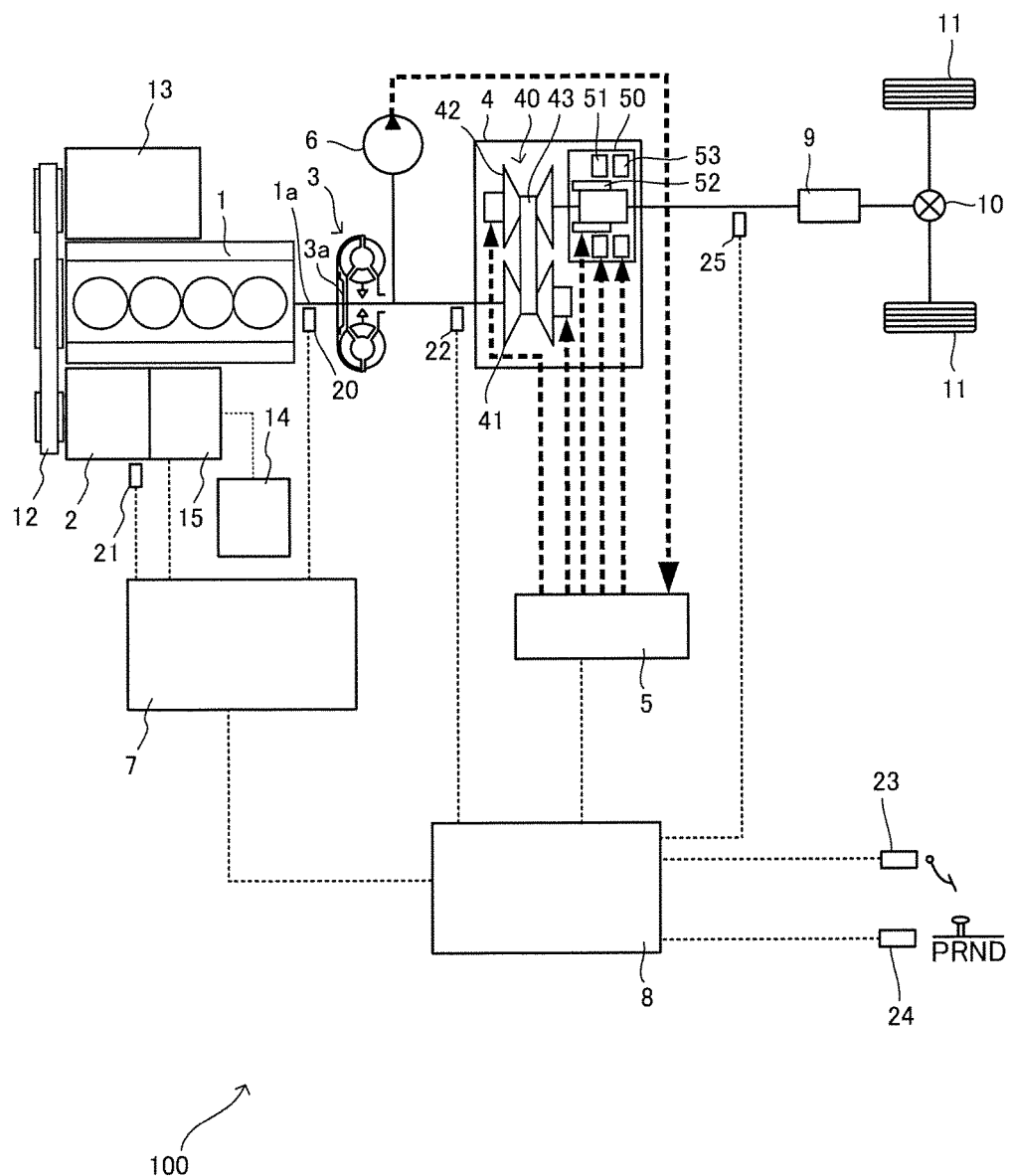
FIG. 1 is a schematic configuration diagram of a vehicle according to an embodiment of the present invention.

FIG. 1 is a schematic configuration diagram of a vehicle 100 according to an embodiment of the present invention.

The vehicle 100 includes an engine 1, a motor-generator 2, a torque converter 3, a continuously variable transmission 4, a hydraulic control circuit 5, an oil pump 6, an integrated controller 7, and a transmission controller 8. The integrated controller 7 and the transmission controller 8 are coupled by Controller Area Network (CAN) one another, so as to be ready to communicate with one another.

In the vehicle 100, an engine torque generated by the engine 1 is output from an output shaft 1a to be transmitted to a wheel 11 via the torque converter 3, the continuously variable transmission 4, a final reduction gear 9, and a differential gear 10. The vehicle 100 is configured to perform a torque assist that transmits a motor torque generated by the motor-generator 2 to the output shaft 1a of the engine 1 via such as a belt 12. In the torque assist, the engine torque and the motor torque are transmitted to the wheel 11.

The engine 1 is configured to transmit the generated engine torque to the wheel 11 to cause the vehicle 100 to travel, and simultaneously, transmit a part of the engine torque to a compressor 13 for an air conditioner and the motor-generator 2 via such as the belt 12 so as to drive these units.

The motor-generator 2 has a function as an electric motor that receives an electric power supply from a battery 14 to be rotatably driven, and a function as an electric generator that is rotated by an external force to generate an electric power.

The motor-generator 2 is coupled to the battery 14 via an inverter 15. When the torque assist is performed, the motor-generator 2 functions as the electric motor. On the other hand, in the case of being driven by the engine 1, or in the case where a regenerative control is performed, the motor-generator 2 functions as the electric generator.

The torque converter 3 includes a lock-up clutch 3a, and when the lock-up clutch 3a is completely engaged, an input shaft and an output shaft of the torque converter 3 are directly connected one another to rotate at an identical speed.

The continuously variable transmission 4 includes a variator 40 and a sub-transmission mechanism 50.

The variator 40 includes a primary pulley 41, a secondary pulley 42, and a belt 43. In the variator 40, controlling a hydraulic pressure supplied to the primary pulley 41 and a hydraulic pressure supplied to the secondary pulley 42 varies groove widths of the pulleys 41, 42 to change a contact radius with the belt 43, so as to change a speed ratio. In the variator 40, a transmitted torque capacity is controlled such that the belt 43 does not slip. Increasing the hydraulic pressure supplied to the pulleys 41, 42 increases a force for the pulleys 41, 42 to hold the belt 43, thus increasing the transmitted torque capacity.

The sub-transmission mechanism 50 is a transmission mechanism having two stages for forward and one stage for backward. The sub-transmission mechanism 50 includes a Ravigneaux type planetary gear mechanism and a plurality of friction engaging elements 51 to 53 (a Low brake 51, a High clutch 52, and a Rev brake 53). The Ravigneaux type planetary gear mechanism couples carriers of two planetary gears. The friction engaging elements 51 to 53 are coupled to a plurality of rotating elements constituting the Ravigneaux type planetary gear mechanism to change a linking state of these elements. Adjusting the hydraulic pressure supplied to the friction engaging element 51 to 53 each to change an engaging or a disengaging state of the friction engaging element 51 to 53 each changes a gear position of the sub-transmission mechanism 50.

In the continuously variable transmission 4, changing a speed ratio of the variator 40 and a gear position of the sub-transmission mechanism 50 changes a speed ratio of the continuously variable transmission 4 as a whole.

The hydraulic control circuit 5 is constituted of a plurality of flow passages and a plurality of hydraulic control valves. The hydraulic control circuit 5 controls the plurality of the hydraulic control valves to switch a supply passage for hydraulic pressure on the basis of a shift control signal from the transmission controller 8, and additionally, prepares a required line pressure from the hydraulic pressure generated by the oil pump 6, so as to supply the line pressure to each portion of the variator 40, the sub-transmission mechanism 50, and the torque converter 3.

The integrated controller 7 controls operations of the engine 1 and the motor-generator 2 based on a signal from a rotation speed sensor 20 to detect a rotation speed of the engine 1, signals from various sensors (not illustrated), and similar signal. Further, the integrated controller 7 performs fault diagnoses on the various sensors, condition diagnoses on the engine 1 and the motor-generator 2 based on such as the signal from the various sensors, and similar diagnosis.

The integrated controller 7 performs a calculation to obtain a torque output from the output shaft 1a of the engine 1 by the engine 1 and the motor-generator 2. For example, the integrated controller 7 calculates the engine torque generated by the engine 1 based on such as a fuel injection quantity and a throttle position of the engine 1, and simultaneously, calculates the motor torque generated by the motor-generator 2 based on such as a signal from a rotation speed sensor 21 that detects a rotation speed of the motor-generator 2. Then, the integrated controller 7 calculates the torque output from the output shaft 1a of the engine 1 based on these calculation values.

To the transmission controller 8, a signal from the rotation speed sensor 20, a signal from a rotation speed sensor 22 that detects an input rotation speed of the continuously variable transmission 4, a signal from an accelerator position sensor 23 that detects an accelerator position APO, a signal from an inhibitor switch 24 that detects a position of a shift lever, a signal from a vehicle speed sensor 25 that detects a vehicle speed VSP, a signal relating to the calculation value (hereinafter referred to as a torque calculation value), which is obtained by the integrated controller 7 and output from the output shaft 1a, of the torque, and similar signal are input. The transmission controller 8 controls the operations of the continuously variable transmission 4 based on these signals.

Now, as described above, the continuously variable transmission 4 controls the hydraulic pressure supplied to the primary pulley 41 and the secondary pulley 42 to control the transmitted torque capacity of the variator 40. The hydraulic pressure supplied to the pulleys 41, 42 is decided based on the torque calculation value calculated by the integrated controller 7.

Here, for example, in the case where the torque generated by the motor-generator 2 fails to be normally detected due to such as a trouble in the rotation speed sensor 21, the operating state of the motor-generator 2 becomes to be undecidable, so as to cause a difference between a torque value (hereinafter referred to as an actual torque value) actually output from the output shaft 1a of the engine 1 and the torque calculation value. Then, when the actual torque value is increased to higher than the torque calculation value, the transmitted torque capacity of the variator 40 possibly becomes to be insufficient to cause the belt 43 to slip.

Figure 2:
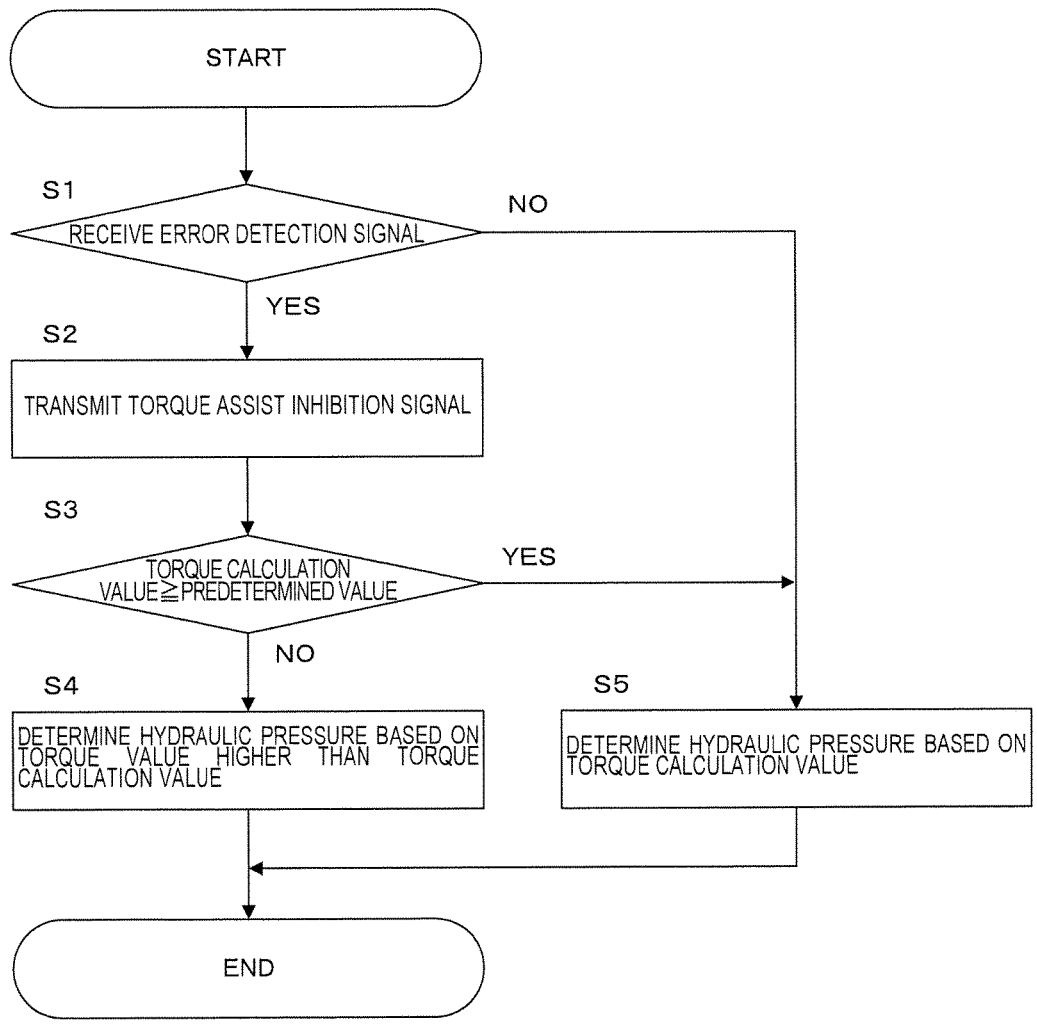
FIG. 2 is a flowchart indicating contents of a control performed by a transmission controller.

Therefore, the transmission controller 8 of this embodiment performs controls described below to prevent the belt 43 of the variator 40 from slipping when the torque of the motor-generator 2 fails to be normally detected. The following describes the controls performed by the transmission controller 8 by referring to a flowchart indicated in FIG. 2.

First, in S1, the transmission controller 8 determines whether the integrated controller 7 has received a signal transmitted in the case where a torque detection error of the motor-generator 2 is detected.

As described above, the integrated controller 7 is configured to perform various condition diagnoses. In the case where the torque generated by the motor-generator 2 fails to be normally detected due to such as a trouble in the rotation speed sensor 21, the integrated controller 7 determines the torque detection error of the motor-generator 2 to be detected, thus transmitting an error detection signal to the transmission controller 8.

When the integrated controller 7 detects the torque detection error of the motor-generator 2, the integrated controller 7 has the torque generated by the motor-generator 2 as 0 N·m to perform the subsequent calculations of the torque calculation value.

When the transmission controller 8 determines to have received the error detection signal from the integrated controller 7, the process proceeds to S2.

In S2, the transmission controller 8 transmits a signal that inhibits a torque assist of the motor-generator 2 to the integrated controller 7, and the process proceeds to S3.

When the torque assist is performed in a state where the torque calculation value is calculated with the torque generated by the motor-generator 2 as 0 N·m, the actual torque value increases to higher than the torque calculation value to cause the transmitted torque capacity of the variator 40 to become to be insufficient. Accordingly, when the integrated controller 7 detects the torque detection error, the transmission controller 8 inhibits the torque assist so as to prevent the actual torque value from actively being put into a state of increased to higher than the torque calculation value.

When the transmission controller 8 determines not to have received the error detection signal from the integrated controller 7, the process proceeds to S5.

In S5, the transmission controller 8 determines the hydraulic pressure supplied to the pulleys 41, 42 based on the torque calculation value. In a normal state where the torque detection error is not detected, supplying the pulleys 41, 42 with the hydraulic pressure determined based on the torque calculation value prevents the belt 43 of the variator 40 from slipping.

Next, the controls in S3 and following Steps will be described by referring to FIG. 3. The controls in S3 and following Steps are performed to prevent the belt 43 of the variator 40 from slipping in the case where the motor-generator 2 generates the electric power, that is, in the case where a load torque is generated by the motor-generator 2.

Figure 3:
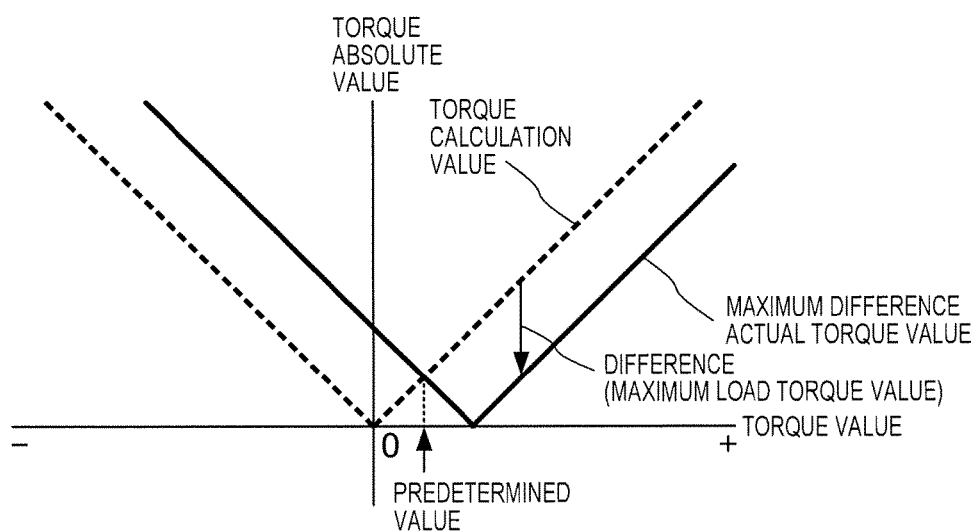
FIG. 3 is a drawing indicating a relation between a torque calculation value and an actual torque value.

A horizontal axis of FIG. 3 indicates the torque value output from the output shaft 1a of the engine 1, having a positive side as the driving torque and a negative side as the load torque. A vertical axis of FIG. 3 indicates an absolute value of the torque value.

In S3, the transmission controller 8 determines whether the torque calculation value is equal to or more than a predetermined value.

As indicated in FIG. 3, the predetermined value is a value where the absolute value of the torque calculation value corresponds to the absolute value of the actual torque value (hereinafter referred to as a maximum difference actual torque value) differed from the torque calculation value by a maximum load torque value at a time where the amount of power generation of the motor-generator 2 is maximum. That is, the predetermined value is a value determined based on the maximum load torque value of the motor-generator 2, and for example, the predetermined value can be configured to be ½ of the maximum load torque value. It should be noted that the maximum load torque value is preliminarily determined in design.

When the transmission controller 8 determines the torque calculation value to be equal to or more than the predetermined value, the process proceeds to S5.

As described above, the predetermined value is the value where the absolute value of the torque calculation value corresponds to the absolute value of the maximum difference actual torque value. Then, in a region where the torque calculation value is equal to or more than the predetermined value, the absolute value of the torque calculation value is equal to or more than the absolute value of the actual torque value regardless of the load torque actually generated by the motor-generator 2. Accordingly, in the case where the torque calculation value is equal to or more than the predetermined value, supplying the pulleys 41, 42 with the hydraulic pressure determined based on the torque calculation value prevents the belt 43 of the variator 40 from slipping.

When the transmission controller 8 determines the torque calculation value to be less than the predetermined value, the process proceeds to S4.

In S4, the transmission controller 8 determines the hydraulic pressure supplied to the pulleys 41, 42 based on the torque value higher than the torque calculation value. It should be noted that, when it is said that the torque value is high, it means that the absolute value of the torque value is high.

Specifically, the transmission controller 8 determines the hydraulic pressure supplied to the pulleys 41, 42 based on the absolute value of the maximum difference actual torque value.

In a region where the torque calculation value is less than the predetermined value, the absolute value of the actual torque value is equal to or less than the absolute value of the maximum difference actual torque value regardless of the load torque actually generated by the motor-generator 2. Accordingly, supplying the pulleys 41, 42 with the hydraulic pressure determined based on the absolute value of the maximum difference actual torque value prevents the belt 43 of the variator 40 from slipping.

The amount of power generation of the motor-generator 2, that is, the load torque is constantly variable. Then, as described above, the transmission controller 8 changes a method for determining the hydraulic pressure supplied to the pulleys 41, 42 between in the case where the torque calculation value is equal to or more than the predetermined value and in the case where the torque calculation value is less than the predetermined value, thus preventing the belt 43 of the variator 40 from slipping in all the regions in the torque detection error of the motor-generator 2.

The transmission controller 8 determines the hydraulic pressure supplied to the pulleys 41, 42 based on a value higher than the torque calculation value only in the case where the torque calculation value is less than the predetermined value, thus limiting a condition where the hydraulic pressure supplied to the pulleys 41, 42 is increased. Accordingly, even in the case where the torque detection error of the motor-generator 2 is detected, the load applied to the oil pump 6 can be reduced, so as to inhibit a fuel efficiency of the vehicle 100 from getting worse.

As described above, according to this embodiment, when the torque detection error of the motor-generator 2 is detected, the hydraulic pressure supplied to the pulleys 41, 42 is decided based on the torque calculation value or the torque value higher than the torque calculation value corresponding to the torque calculation value. This ensures supplying the pulleys 41, 42 with an appropriate hydraulic pressure in the torque detection error of the motor-generator 2, thus preventing the belt 43 of the variator 40 from slipping.

In detail, when the torque detection error of the motor-generator 2 is detected, in the case where the torque calculation value is equal to or more than the predetermined value determined based on the maximum load torque value, the hydraulic pressure supplied to the pulleys 41, 42 is determined based on the torque calculation value, and in the case where the torque calculation value is less than the predetermined value, the hydraulic pressure supplied to the pulleys 41, 42 is decided based on the absolute value of the maximum difference actual torque value. This ensures supplying the pulleys 41, 42 with the appropriate hydraulic pressure in the torque detection error of the motor-generator 2, thus preventing the belt 43 of the variator 40 from slipping in all the regions. The hydraulic pressure supplied to the pulleys 41, 42 is determined based on the absolute value of the maximum difference actual torque value only in the case where the torque calculation value is less than the predetermined value, thus limiting a condition where the hydraulic pressure supplied to the pulleys 41, 42 is increased. Accordingly, even in the case where the torque detection error of the motor-generator 2 is detected, the load applied to the oil pump 6 can be reduced, so as to inhibit a fuel efficiency of the vehicle 100 from getting worse.

In other words, the transmission controller 8 selects the existence of the correction corresponding to the torque calculation value when the torque detection error is detected.

That is, the transmission controller 8 performs no correction when the torque calculation value is equal to or more than the predetermined value in the case where the torque detection error is detected.

On the other hand, in the case where the torque detection error is detected, when the torque calculation value is less than the predetermined value, the transmission controller 8 performs the correction of the value to be higher than the torque calculation value, so as to prevent the belt 43 of the variator 40 from slipping.

The following description will be given dividing into the case where the torque calculation value is less than the predetermined value and the case where the torque calculation value is equal to or more than the predetermined value.

<Case where Torque Calculation Value is Less than Predetermined Value>

In the case where the torque detection error is detected and the torque calculation value is less than the predetermined value, when the motor-generator 2 does not generate the electric power, the torque calculation value is approximately equal to the actual torque value. When the motor-generator 2 generates the electric power, the torque calculation value is lower than the actual torque value.

Then, in the case where the torque calculation value is less than the predetermined value, constantly correcting to a value lower than the torque calculation value causes the hydraulic pressure supplied to the pulleys 41, 42 to be constantly insufficient regardless of the existence of the electric generation by the motor-generator 2, thus constantly generating a possibility for the belt 43 of the variator 40 to slip.

In the case where the torque calculation value is less than the predetermined value, when the correction does not performed constantly, the hydraulic pressure supplied to the pulleys 41, 42 becomes to be insufficient during the electric generation by the motor-generator 2, thus generating a possibility for the belt 43 to slip.

Accordingly, the transmission controller 8 performs the correction to the value higher than the torque calculation value in the case where the torque detection error is detected and the torque calculation value is less than the predetermined value.

<Case where Torque Calculation Value is Equal to or More than Predetermined Value>

In the case where the torque detection error is detected and the torque calculation value is equal to or more than the predetermined value, when the motor-generator 2 does not generate the electric power, the torque calculation value is approximately equal to the actual torque value. When the motor-generator 2 generates the electric power, the torque calculation value is higher than the actual torque value.

Then, in the case where the torque calculation value is equal to or more than the predetermined value, constantly correcting to a value higher than the torque calculation value causes the hydraulic pressure supplied to the pulleys 41, 42 to be constantly excessive regardless of the existence of the electric generation by the motor-generator 2.

On the other hand, in the case where the torque calculation value is equal to or more than the predetermined value, constantly correcting to a value lower than the torque calculation value decreases the hydraulic pressure supplied to the pulleys 41, 42 insofar as the case where the electric generation by the motor-generator 2 decreases the actual torque value to lower than the lower value, thus reducing the load applied to the oil pump 6, so as to be good from the aspect of the fuel efficiency.

However, assume that the correction is constantly performed to a value lower than the torque calculation value in the case where the torque calculation value is equal to or more than the predetermined value. When the motor-generator 2 does not generate the electric power, or when the actual torque value increases to higher than the lower value even if the motor-generator 2 generate the electric power, the hydraulic pressure supplied to the pulleys 41, 42 becomes to be insufficient, thus generating a possibility for the belt 43 to slip.

Accordingly, the transmission controller 8 does not perform the correction to a value either lower or higher than the torque calculation value in the case where the torque detection error is detected and the torque calculation value is equal to or more than the predetermined value.

According to this embodiment, when the torque detection error of the motor-generator 2 is detected, the torque assist of the motor-generator 2 is inhibited, thus preventing the actual torque value from actively being put into a state of increased to higher than the torque calculation value.

The embodiments of the present invention described above are merely illustration of some application examples of the present invention and not of the nature to limit the technical scope of the present invention to the specific constructions of the above embodiments.

For example, while the variator 40 includes the belt 43 in the above embodiment, the variator 40 may include an endless member such as a chain instead of the belt 43.

While the continuously variable transmission 4 includes the sub-transmission mechanism 50 in the above embodiment, the continuously variable transmission 4 may be disposed without the sub-transmission mechanism 50. In this case, simply disposing a forward-reverse changeover mechanism causes the vehicle 100 to be switched between the forward movement and the reverse movement.

While the vehicle 100 includes the integrated controller 7 that controls the operations of the engine 1 and the motor-generator 2 in the above embodiment, the controller may be divided into an engine controller that controls the engine 1 and a motor-generator controller that controls the motor-generator 2.

In this case, for example, it is only necessary that the motor-generator controller includes an error detection means that detects the torque detection error of the motor-generator 2, and the engine controller includes a torque calculation means that performs a calculation to obtain the torque output from the output shaft 1*a* of the engine 1 by the engine 1 and the motor-generator 2.

It should be noted that the torque calculation means calculates the torque output from the output shaft 1*a* of the engine 1 by, for example, adding an output torque value of the motor-generator 2 calculated by the motor-generator controller to an output torque value of the engine 1 calculated by the engine controller.

With respect to the above description, the contents of application No. 2014-152167, with a filing date of Jul. 25, 2014 in Japan, are incorporated herein by reference.

The invention claimed is:

1. A continuously variable transmission included in a vehicle, the vehicle including a motor-generator and a power control unit, the motor-generator being coupled to an output shaft of an engine, the power control unit including a torque calculation unit and an error detection unit and being configured to control operations of the engine and the motor-generator, the torque calculation unit being configured to calculate a torque output from the output shaft, the error detection unit being configured to detect a torque detection error of the motor-generator, the continuously variable transmission being configured to shift a rotation of the output shaft to output to a wheel, the continuously variable transmission comprising:
- a primary pulley that has a groove width varied by a hydraulic pressure, the rotation of the output shaft being transmitted to the primary pulley;
- a secondary pulley that has a groove width varied by a hydraulic pressure, a rotation of the primary pulley being shifted to be transmitted to the secondary pulley via an endless member; and
- a shift control unit configured to control an operation of the continuously variable transmission, wherein:
- the shift control unit includes a hydraulic pressure control unit,
- the hydraulic pressure control unit is configured to determine hydraulic pressures supplied to the primary pulley and the secondary pulley on a basis of a torque calculation value calculated by the torque calculation unit of the power control unit in a case where the error detection unit of the power control unit does not detect the torque detection error,
- the hydraulic pressure control unit is configured to determine the hydraulic pressures supplied to the primary pulley and the secondary pulley on a basis of the torque calculation value in a case where the error detection unit detects the torque detection error and the torque calculation value calculated by the torque calculation unit is equal to or more than a predetermined value, and
- the hydraulic pressure control unit is configured to determine the hydraulic pressures supplied to the primary pulley and the secondary pulley on a basis of a torque value higher than the torque calculation value in a case where the error detection unit detects the torque detection error and the torque calculation value calculated by the torque calculation unit is less than the predetermined value.

2. The continuously variable transmission according to claim 1, wherein
the predetermined value is determined on a basis of a maximum load torque value of the motor-generator.

3. The continuously variable transmission according to claim 1, wherein
the shift control unit includes an inhibition signal transmitting unit,
the inhibition signal transmitting unit is configured to calculate the torque calculation value with a torque generated by the motor-generator as 0 N·m and transmit a signal to inhibit a torque assist to the power control unit in a case where the error detection unit detects the torque detection error, the torque assist being a transmission of a torque generated by the motor-generator to the output shaft.

4. A control method of a continuously variable transmission included in a vehicle, the vehicle including a motor-generator and a power control unit, the motor-generator being coupled to an output shaft of an engine, the power control unit including a torque calculation means and an error detection means and configured to control operations of the engine and the motor-generator, the torque calculation means being configured to calculate a torque output from the output shaft, the error detection means being configured to detect a torque detection error of the motor-generator, the continuously variable transmission including a primary pulley and a secondary pulley, the primary pulley having a groove width varied by a hydraulic pressure, a rotation of the output shaft being transmitted to the primary pulley, the secondary pulley having a groove width varied by a hydraulic pressure, a rotation of the primary pulley being shifted to be transmitted to the secondary pulley via an endless member, and the continuously variable transmission being configured to shift the rotation of the output shaft to output to a wheel, the control method comprising:
- determining hydraulic pressures supplied to the primary pulley and the secondary pulley on a basis of a torque calculation value calculated by the torque calculation means of the power control unit in a case where the error detection means of the power control unit does not detect the torque detection error;
- determining the hydraulic pressures supplied to the primary pulley and the secondary pulley on a basis of the torque calculation value in a case where the error detection means detects the torque detection error and the torque calculation value calculated by the torque calculation means is equal to or more than a predetermined value; and
- determining the hydraulic pressures supplied to the primary pulley and the secondary pulley on a basis of a torque value higher than the torque calculation value in a case where the error detection means detects the torque detection error and the torque calculation value calculated by the torque calculation means is less than the predetermined value.

5. A continuously variable transmission included in a vehicle, the vehicle including a motor-generator and a power control unit, the motor-generator being coupled to an output shaft of an engine, the power control unit including a torque calculation means and an error detection means and being configured to control operations of the engine and the motor-generator, the torque calculation means being configured to calculate a torque output from the output shaft, the error detection means being configured to detect a torque detection error of the motor-generator, the continuously variable transmission being configured to shift a rotation of the output shaft to output to a wheel, the continuously variable transmission comprising:
- a primary pulley that has a groove width varied by a hydraulic pressure, the rotation of the output shaft being transmitted to the primary pulley;
- a secondary pulley that has a groove width varied by a hydraulic pressure, a rotation of the primary pulley being shifted to be transmitted to the secondary pulley via an endless member; and
- a shift control unit configured to control an operation of the continuously variable transmission, wherein:
- the shift control unit includes a hydraulic pressure control means,
- the hydraulic pressure control means is configured to determine hydraulic pressures supplied to the primary pulley and the secondary pulley on a basis of a torque calculation value calculated by the torque calculation means of the power control unit in a case where the error detection means of the power control unit does not detect the torque detection error,
- the hydraulic pressure control means is configured to determine the hydraulic pressures supplied to the primary pulley and the secondary pulley on a basis of the torque calculation value in a case where the error detection means detects the torque detection error and the torque calculation value calculated by the torque calculation means is equal to or more than a predetermined value, and the hydraulic pressure control means is configured to determine the hydraulic pressures supplied to the primary pulley and the secondary pulley on a basis of a torque value higher than the torque calculation value in a case where the error detection means detects the torque detection error and the torque calculation value calculated by the torque calculation means is less than the predetermined value.

* * * * *